United States Patent [19]
Wheatley

[11] Patent Number: 5,431,445
[45] Date of Patent: Jul. 11, 1995

[54] ASYMMETRICAL BEAM STRUCTURE FOR A VEHICLE

[75] Inventor: Donald G. Wheatley, Ann Arbor, Mich.

[73] Assignee: Ford Motor Company, Dearborn, Mich.

[21] Appl. No.: 345,194

[22] Filed: Nov. 28, 1994

[51] Int. Cl.⁶ .............................................. B62D 21/15
[52] U.S. Cl. ...................... 280/784; 188/377; 296/189
[58] Field of Search ................... 280/784; 180/274; 188/377; 296/189

[56] References Cited

U.S. PATENT DOCUMENTS

| | | |
|---|---|---|
| 3,795,410 | 3/1974 | Huber . |
| 4,413,840 | 11/1983 | Shah ........................ 280/784 |
| 4,431,221 | 2/1984 | Jahnle . |
| 4,702,515 | 10/1987 | Kato et al. . |
| 5,085,485 | 2/1992 | Wurl . |

FOREIGN PATENT DOCUMENTS

| | | | |
|---|---|---|---|
| 267895A | 5/1988 | European Pat. Off. . | |
| 2459518 | 7/1976 | Germany ........................ 280/784 |
| 54-3667 | 1/1979 | Japan ........................ 188/377 |
| 136660 | 10/1980 | Japan ........................ 280/784 |
| 4-39172A | 2/1992 | Japan . | |
| 4-63775A | 2/1992 | Japan . | |

Primary Examiner—Karin L. Tyson
Attorney, Agent, or Firm—Donald A. Wilkinson; Roger L. May

[57] ABSTRACT

A vehicle frame (10) including longitudinally extending side rails (12). Each of the side rails (12) has a hollow beam structure and includes a series of sets of corner divots (24) along the corners (22). Each corner divot (26) extends along one side (20) a distance (L) and along an adjacent side (20) a shorter distance (S). The long and short portions of each corner divot 26 are oriented opposite to the corner divots (26) on either side of it along the same corner (22), and the long portion (L) is located on a side where it and the adjacent corner divot both have their respective long portion (L) on this side (20). This forms an asymmetrical pattern of divots on each of the frame rails (12), providing improved crush characteristics along the frame rails (12).

16 Claims, 4 Drawing Sheets

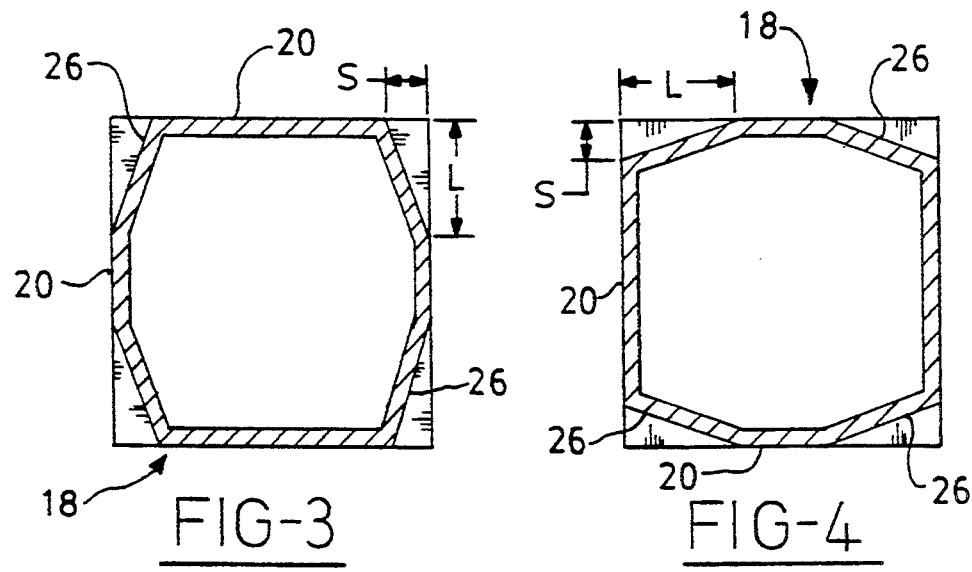
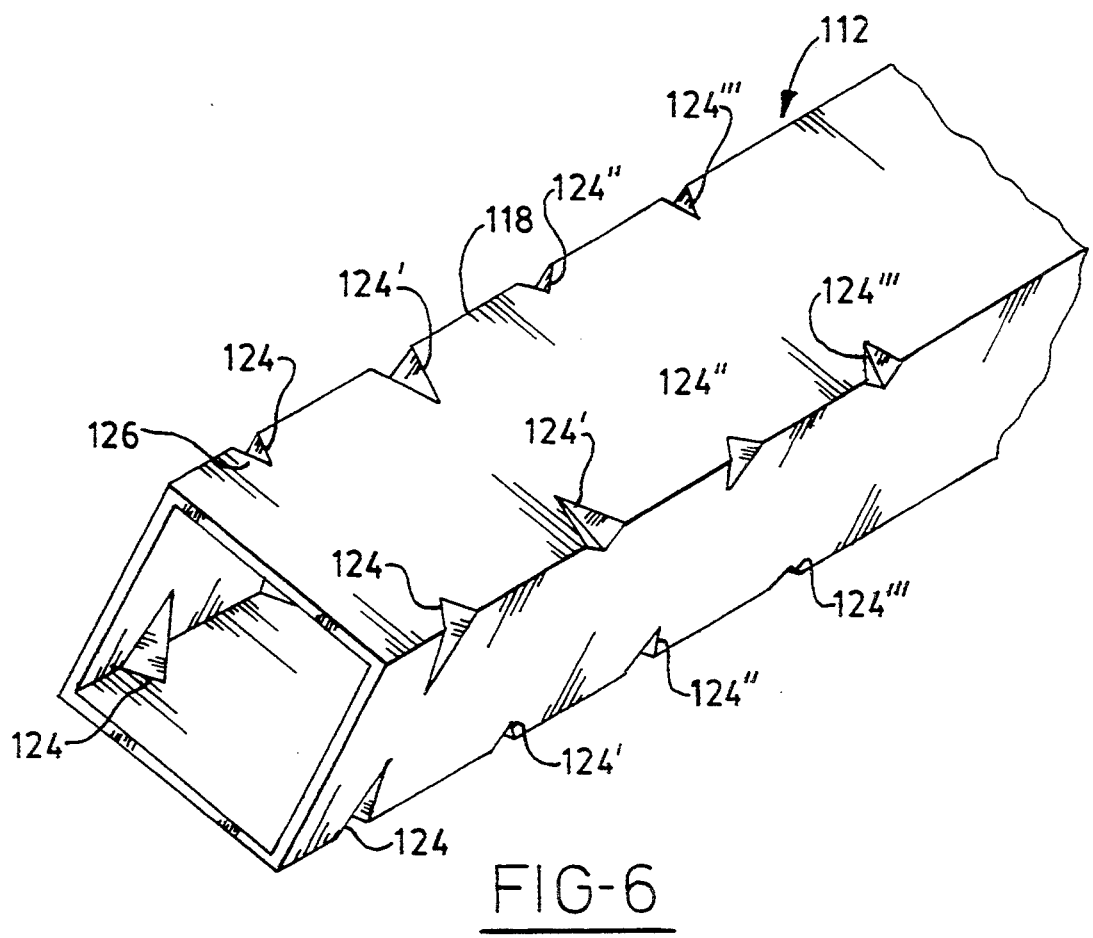

ASYMMETRICAL BEAM STRUCTURE FOR A VEHICLE

FIELD OF THE INVENTION

The present invention relates to energy absorbing beams used in vehicle structures.

BACKGROUND OF THE INVENTION

In a conventional vehicle, longitudinally running beams, called side rails, form part of the vehicle's body, and, among other things, support a front bumper. The beams are typically tubular shaped and are generally designed to absorb frontal impact loads exerted against the front bumper in the longitudinal direction of the vehicle. In order to absorb the energy of these frontal loads, the beams are designed to axially crush. To provide for a more controlled crush of these beams, triggers are sometimes incorporated into the beams. They are generally located along the sides of the beams.

A typical crush triggering type of configuration incorporates symmetrical beads, whether located as side beads or beads located on the corners of a beam, such as corner divots. By allowing the beads to initiate crush in the tubular structure of these beams, a lower overall crush load and/or a somewhat more predictable crush deformation will take place. Properly designed beads can also result in a somewhat lower variation between peak and minimum loadings of the beam. These types of beads are in use, but due to the symmetry that most of them possesses, they do not predispose the structure to crush in a consistent manner, with consistent loadings.

Consistency of crush for these beams is desired because it has the advantage of improved predictability from vehicle-to-vehicle, allowing for more precision in the design. Also, by knowing beforehand which way a structure will consistently buckle, components mounted near the frame rails of a vehicle can be positioned in the structure so that they do not interfere with the beams during crushing, In an attempt to overcome these shortcomings of typical symmetrical triggers, asymmetrical triggers can be used to better control deformation of the beam structure. This forces the deformation during crush to move more consistently in a desired mode. Further, asymmetrical triggers generally will have a lower overall energy absorption and less variation of force over time than symmetric triggers. This results in a desirable characteristic of less load fluctuation. A reduction in load fluctuation assures that the structure supporting the frame rails will not collapse prematurely while the frame rails are crushing, which further leads to greater predictability in load characteristics.

U.S. Pat. No. 4,702,515 to Karo et al. discloses a structure that uses asymmetrical beads on the sides of a beam in an attempt to better predict and control the crush deformation characteristics by proper longitudinal spacing of the beads along the beam. It discloses alternating side beads inward and outward to control the beam crush deformation. It also discloses substituting some of the side beads with corner beads to co-operate with the side beads to control the crush deformation at the given longitudinal spacing. However, Karo et al. does not disclose being able to control the crush completely with corner beads, nor how this could be properly used in an asymmetrical fashion to adequately control all of the crush characteristics.

The corners of the beams absorb much more of the energy than the sides. Thus, to better control and provide for more consistent loading, the crush of the corners of the beams must be adequately controlled. Consequently, asymmetrical corner beads are better than side beads for controlling loading, particularly in heavy gauge sections, such as frames in light and heavy duty trucks and large automobiles, when a lowering of the axial crush load is desired. This is important since heavy gage frames are thick and, as a result, can cause the crush force to be too high for good overall crush characteristics of that beam.

One consequence, when employing corner beads, is the fact that when corner beads are employed solely to reduce the frontal crush loads required in heavy gage beams, the bending moment of inertia of the beam is reduced at the cross-sections where the beads are. This can sometimes be undesirable, particularly farther back on the beam where beam bending will be greater. This is not the case with side beads, which will slightly increase the bending moment of inertia. Thus, a further desire exists to allow for controlled crush employing corner beads while minimizing the reduction in bending capability of the beam.

SUMMARY OF THE INVENTION

In its embodiments, the present invention contemplates a beam for use in a vehicle structure comprising a polygon shaped cross-section having an even number of sides, with the number of sides being at least four, and with the sides intersecting to form four corners extending in a longitudinal direction. The beam further includes a plurality of spaced divots located on the corners of the beam. The plurality of spaced divots form a plurality of sets of corresponding corner divots, each set including divots equal to the number of corners, with each set of corner divots also spaced at substantially the same longitudinal distance along the corners of the beam, and with one divot of each set of divots on a different one of the corners. Each of the divots extends in a transverse direction to its respective corner and has a long axis and a short axis, normal to the long axis, such that each divot on a given corner along the beam has its long axis perpendicular to the long axis of the divots that may be on either side of the given divot. Each divot further has each long axis on the same one of the sides as the long axis of another divot in that set of corner divots.

Accordingly, an object of the present invention is to provide a vehicle beam having multiple sets of asymmetrical corner divots to thereby create predictable crush characteristics when frontal impact loads are applied to the vehicle.

It is an advantage of the present invention that the frontal axial crush characteristics of a vehicle beam, having multiple sets of asymmetric corner divots, are more controlled and predictable, so that the amount and variation of energy absorption is controlled, even on beams using relatively thick gages of material, and the beam mode, i.e., shape after deformation, is predictable, allowing components to be mounted in the vicinity of the frame rails without interfering with the beam structure while crushing.

It is a further advantage of the present invention that multiple sets of asymmetrical corner divots are used to reduce the frontal crush loads and provide predictable deformation on a vehicle beam while minimizing the overall reduction in bending moment of inertia of the beam.

BRIEF DESCRIPTION OF THE DRAWINGS

FIG. 3 is a sectional view taken along line 3—3 in FIG. 2;

FIG. 4 is a sectional view taken along line 4—4 in FIG. 2;

FIG. 6 is a perspective view of a first alternate embodiment of the typical hollow beam structure of FIG. 2;

DETAILED DESCRIPTION OF THE PREFERRED EMBODIMENTS

Figure 1:
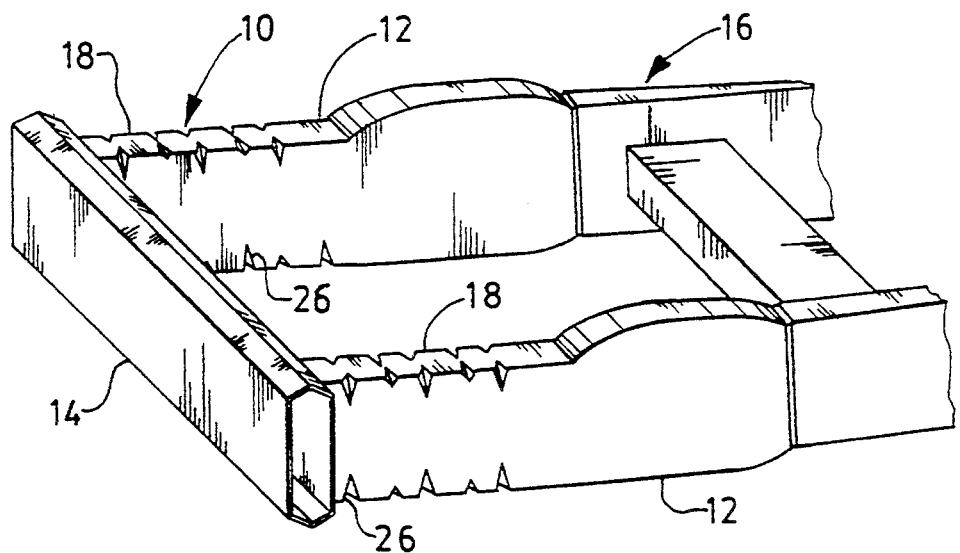
FIG. 1 is a perspective view of a portion of a vehicle frame.
Figure 2:
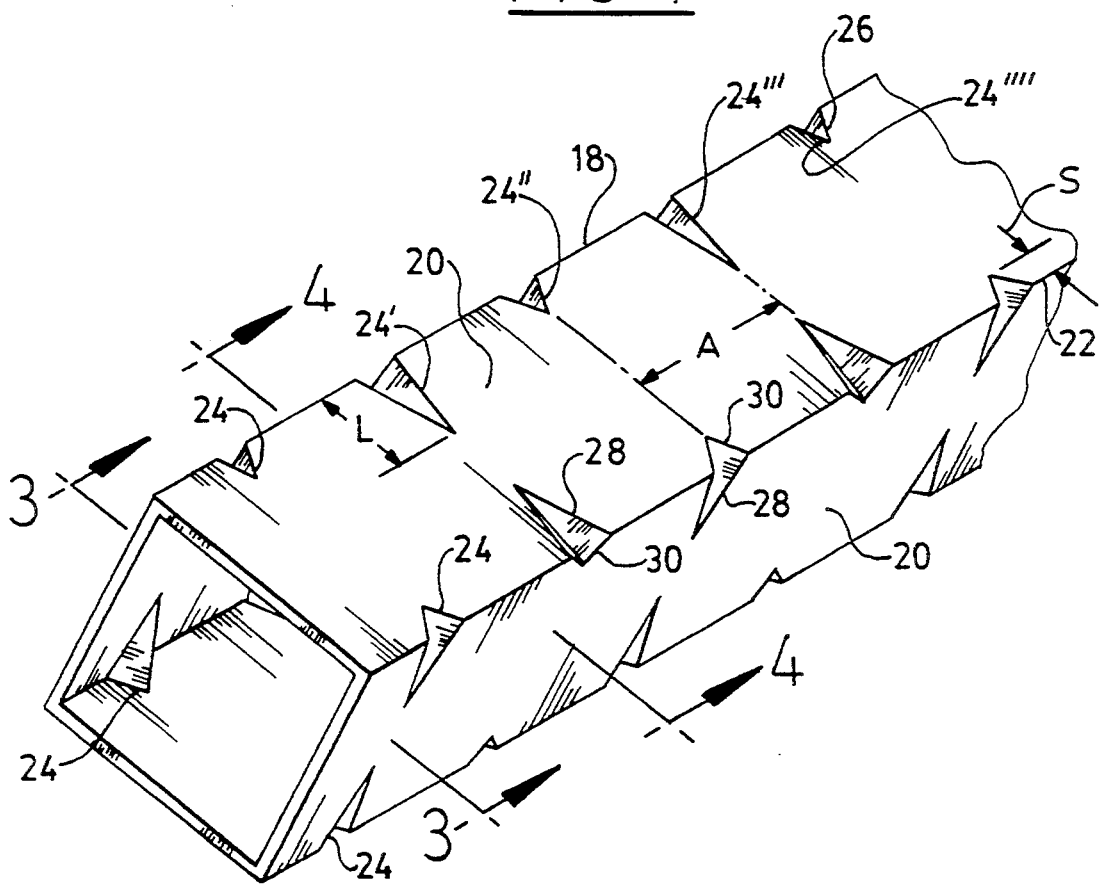
FIG. 2 is a schematic perspective view of a typical hollow beam structure with asymmetrical corner divots that is incorporated into a vehicle frame as in FIG 1;.

A typical vehicle frame 10 includes frame (side) rails 12 that extend in a longitudinal direction and are attached to cross members, such as a front bumper beam 14, that extend in a transverse direction. Frame rails 12 extend back to the forward end of structure forming part of a passenger compartment area 16.

Frame rails 12 generally support other vehicle structure and components and also are designed to absorb, by axial compressive deformation, the impact energy of a frontal load applied to vehicle frame 10 in the axial direction. Forward portions 18 of frame rails 12 have rectangular cross-sectional shapes. Accordingly, forward portions 18 have four sides 20 joined together at four corners 22. The invention disclosed herein can work with many different proportions of sides forming tetragonal shaped cross-sections.

Corner divots 26 are formed in forward portions 18 by bending in the beam material at corners 22 to form triangular indentations, concave into the beam. The divots could also be formed as triangular protrusions, convex outward from the beam, if so desired. Each corner divot 26 encompasses a portion of two adjacent sides 20, forming a first 28 and a second 30 adjacent triangular shaped indentation. Each triangular shaped indentation includes an axis that bisects that triangular shape. Further, each corner divot 26 is proportioned such that first triangular indentation 28 will have a long axis L and second triangular indentation 30 will have a short axis S, making each divot 26 asymmetrically shaped about its respective corner 22. Preferably each divot is less than one half the width of a side of the beam. Furthermore, preferably the long axis L of each divot is three times the length of the short axis.

Corner divots 26 are situated along beam corners 22 to form multiple sets of four 24. Each set 24 includes four corner divots 26 that are substantially equally spaced along forward portion 18 the same longitudinal distance from its forward end. They are also oriented in each set 24 so that each side 20 will contain the portion of two divots 26 that includes either two first indentations 28, both having a corresponding long axis L, or two second indentations 30, both having a corresponding short axis S. Further, as between adjacent sets of corner divots 24, each subsequent corner divot 26 along a given corner 22 has its long axis L perpendicular to the previous divot's long axis L along the same corner 22. Corner divots 26 located in this way will predispose sides 20 of forward portion 18 to collapse inwardly at points where the long axes L of a pair of divots 26 coincide, and likewise, sides 20 are caused to buckle outward at the locations of adjacent short axes S of corner divots 26.

This pattern of divots forms asymmetry in a longitudinal direction along each forward portion 18 as opposed to asymmetry of a particular cross-section of the beam. Preferably, although not required, the spacing A between sets of corner divots 24 is at a natural buckling frequency of forward portion 18. The longitudinal spacing A also could be set to buckle in at certain strategic locations, allowing forward portion 18 to avoid components mounted near it during a crush event.

In a full sized car or light truck there are generally about three to six sets of corner divots 24 spaced along each side rail 12 to obtain the desired crush characteristics, although this number of sets can change depending upon the beam length, thickness, side proportions, and other beam characteristics.

Figure 5A:
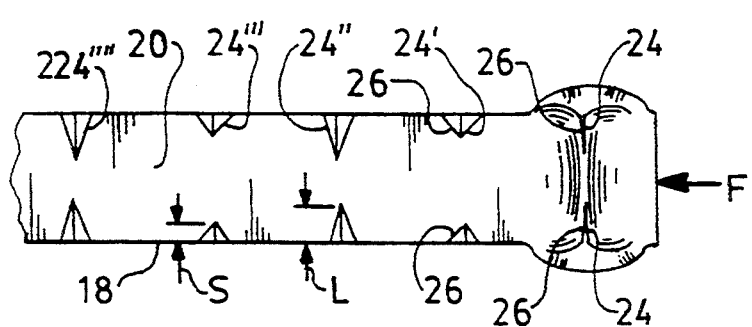
FIGS. 5a, 5b, 5c, and 5d are a side view of the beam of FIG. 2 shown in progressive states of axial crush.
Figure 5D:
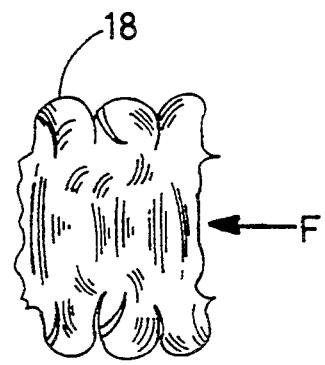
Figure 5B:
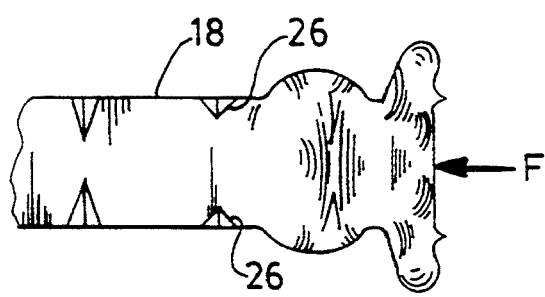
Figure 5C:
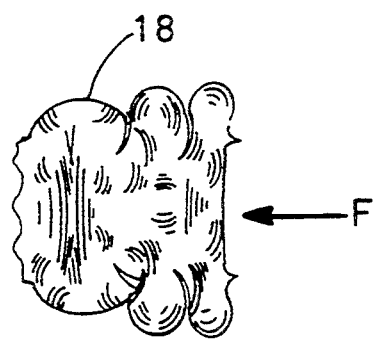

FIGS. 5a–5d show four stages of a typical beam crush, when a frontal impact load F is applied, as it progresses. Asymmetrical corner divots 26 are used as triggers to initiate the crush along the corners 22 of this tubular structure. In FIG. 5a, as load F is introduced, forward portion 18 begins to crush at the first set of corner divots 24. Sides 20, having the long axes L of divots 26, will begin to collapse inward, as sides 20, having short axes S of divots 26, will begin to bulge outward. The crush at the first set of divots 24 continues as the crush at the second set of corner divots 24' begins, with the inward and outward side bulges reversing from the first set of divots 24. As the crush continues, the third set of corner divots 24" begins to crush, bulging on in a similar manner to the first set of divots 24, as seen in FIG. 5b. This continues back to the subsequent sets of corner divots, 24''' and 24'''', while impact load F is still being applied, as illustrated in FIGS. 5c and 5d.

The crush is initiated at a lower load than with straight corners since corners 22 are the portion of side rails 12 that absorbs the bulk of the energy of force F. Due to the resulting reduced and more consistent energy absorption, this configuration will give a more controlled deformation of side rails 12 at a lower and more constant energy level than a beam having symmetrical corner divots or side beads.

The advantage of asymmetrical divots 26 is particularly good in heavy gage sections, such as in light truck or large automobile frames. The heavy gage sections, having thick side walls, can cause the crush forces to be too high for good crush dynamics. Corner divots 26, then, reduce the axial crush load to account for this. This reduction of load fluctuation reduces the risk that the structure supporting side rails 12 will suffer from possible premature collapse when the vehicle is subjected to frontal impact loads.

Further, the collapse can be made to occur in a systematic manner, if so desired. That is, the sequence in which the collapse of the side rails occurs can be controlled by the depth or shape of the corner divots. In the embodiment shown, the ratio of long axis L to short axis S is 3 to 1, although this ratio can be altered somewhat and still produce the desired results.

FIG. 6 illustrates a first alternate embodiment of the present invention. In this configuration, similar elements are shown with similar element numbers, although in a 100 series. Forward portion 118 is substantially the same, except for corner divots 126. Each corner divot 126 within each set of corner divots is the same size as the others, but the size of corner divots 126 is reduced from first set 124 to second set 124', from second set 124' to third set 124" and again from third set 124" to fourth set 124"'.

The tapering of each subsequent set of divots back along the beam continues to allow for control of the crush dynamics of forward portion 118, while minimizing the reduction in bending capability of forward portion 118 toward the back end. This is advantageous when the vehicle encounters frontal impact loads that are not directly head on. The component of the force acting longitudinally is absorbed by beam crush, with the corner divots controlling the crush dynamics, while some of the component of the force acting in a transverse direction is absorbed by bending of side rails 112. Since the corner divots reduce the beam bending moment of inertia at the location of the corner divots, and the bending moment due to the transverse component of force increases toward the back of the forward portion 118, tapering of the sets of corner divots will minimize the reduction in bending moment of inertia where the bending moment is larger.

Figure 8:
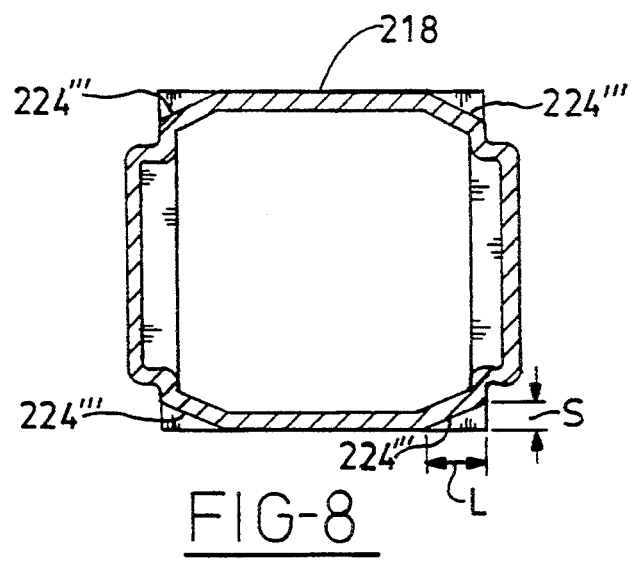
FIG. 8 is a sectional view taken along line 8—8 in FIG. 7.
Figure 7:
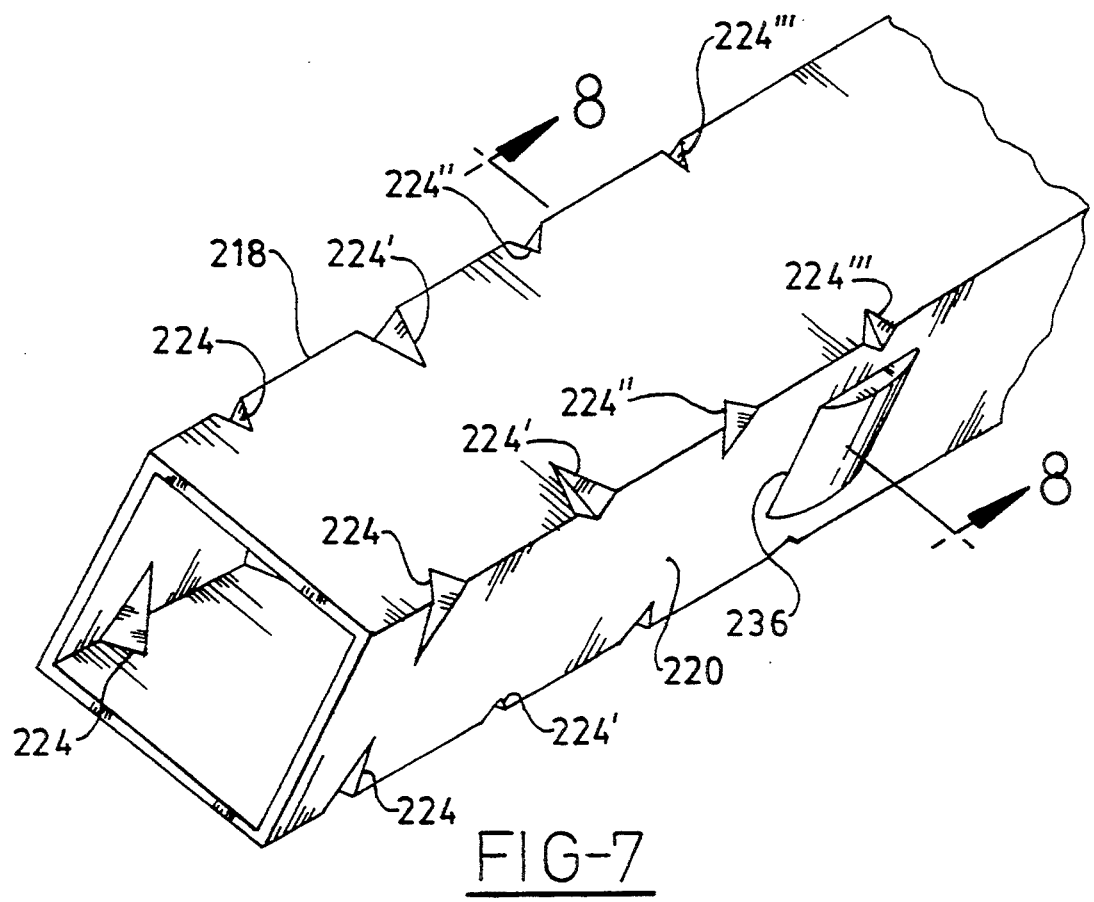
FIG. 7 is a perspective view of a second alternate embodiment of the typical hollow beam structure of FIG. 2.

FIGS. 7 and 8 illustrate a second alternate embodiment. In the construction shown in FIGS. 7 and 8, similar elements are shown with similar element numbers, although in a 200 series. In this embodiment, the sets of corner divots 224 again taper off as in the first alternate embodiment, with the set of divots 224' smaller than set 224, set 224" smaller than set 224' and see 224"' smaller than set 224". Again, as in the first alternate embodiment, the tapering will allow for better bending characteristics by minimizing the reduction in bending moment of inertia at the locations of the corner divots.

In addition, side beads 236 are formed in sides 220 where the short axis S' is located for set 224"'. Since the long axis L' is shorter than divots at the forward end of forward section 218, less control of the beam crush dynamics will be had. Side beads 236 compliment corner divots 224"' to control the axial crush characteristics better while maintaining the bending moment of inertia of the beam at this location to account for any component of a frontal impact load in a transverse direction. There can be more than one set of side beads depending upon the amount of taper and the overall number of sets of corner divots on the particular beam.

While only certain embodiments of the present invention have been described in detail, those familiar with the art to which this invention relates will recognize various alternative designs and embodiments for practicing the invention as defined by the following claims. For example, the beam cross-section need not be tetragonal, it could be a polygon with an even number of sides greater than four, such as a hexagonal or an octagonal shape.

I claim:

1. A beam for use in a vehicle structure comprising:
a polygon shaped cross-section having an even number of sides, with the number of sides being at least four, the sides intersecting to form the same number of corners extending generally in a longitudinal direction; and
a plurality of spaced divots located on the corners of the beam, forming a plurality of sets of corresponding corner divots, each set including divots equal to the number of corners, and each set of four corner divots also spaced at substantially the same longitudinal distance along the corners of the beam, with one divot of each set of divots on a different one of the corners, and with each of the divots extending in a transverse direction to its respective corner, with each divot further having a long axis and a short axis normal to the long axis such that each divot on a given corner along the beam has its long axis perpendicular to the long axis of the divots on the same corner that are adjacent to the given divot and has each long axis on the same one of the sides as the long axis of another divot in that set of corner divots.

2. A beam according to claim 1 wherein each of the divots extends from its respective corner less than one half the length of a side and forms triangular shaped indentations on the two sides adjacent to its respective corner.

3. A beam according to claim 1 wherein each of the divots is concave into its respective corner.

4. A beam according to claim 1 wherein the beam has at least one natural buckling frequency and the longitudinal distance between the sets of corner divots is at a wavelength corresponding to a natural buckling frequency of the beam.

5. A beam according to claim 1 wherein the long axis of each divot is three times as long as the short axis.

6. A beam according to claim 1 wherein each subsequent set of corner divots extending back along the beam is reduced in size from the previous set of corner divots.

7. A beam according to claim 6 wherein the number of sides of the beam is four and further includes a pair of side beads formed on opposite sides of the beam, located to coincide with the most aft set of corner divots, with the side beads being on the sides of the beam that includes the short axes of the divots in that set.

8. A beam according to claim 7 further including a second pair of side beads located on the same sides as the first pair of side beads, and located two sets of corner divots forward from the first pair of side beads.

9. A beam according to claim 1 wherein each of the divots is convex outward from its respective corner.

10. A pair of frame rail beams in a vehicle body, each of the beams being disposed substantially horizontally in a longitudinal direction of the vehicle body, each of the beams comprising:
a first, second, third and fourth side wall defining a tubular quadrangular section having four corners extending the longitudinal direction;
a plurality of spaced corner divots, with an equal number being on each of the four corners and spaced along the four corners in the same plane with each of the corner divots having a long axis and a short axis substantially normal to the longitudinal direction of the beam, with the long axis of each of the coplanar four corner divots being on the same side wall as the long axis of one of the other corner divots and with the long axis of each corner divot perpendicular to the long axis of the adjacent divots that are on the same corner.

11. A pair of frame rails according to claim 10 wherein each of the divots is concave into its respective corner.

12. A pair of frame rails according to claim 10 wherein each of the beams has at least one natural buckling frequency and the longitudinal distance between four corner divots at a given pitch and four longitudinally adjacent corner divots on each frame rail is at a wavelength corresponding to a natural buckling frequency of the beam.

13. A pair of frame rails according to claim 10 wherein each of the four coplanar corner divots is larger than the longitudinally adjacent four corner divots aft of the four coplanar corner divots.

14. A pair of frame rails according to claim 13 wherein each frame rail further includes a pair of side beads formed on opposite sides of the beam, located to coincide with the corner divots located at the aft-most pitch, with the side beads being on the sides of the beam that includes the short axes of the divots at this pitch.

15. A pair of frame rails according to claim 13 wherein each frame rail further includes a second pair of side beads located on the opposite sides as the first pair of side beads, coincident with the corner divots located at the next pitch forward from the first pair of side beads.

16. A frame rail beam in a vehicle body comprising:
a tetragonal shaped cross-section including four sides intersecting to form four corners extending in a longitudinal direction; and
a plurality of spaced divots located on the four corners of the beam, forming a plurality of sets of four corresponding corner divots, each set of four corner divots spaced at substantially the same longitudinal distance along the corners of the beam, with one divot of each set of divots on a different one of the four corners, and with each of the divots extending in a transverse direction to its respective corner, with each divot further having a long axis and a short axis normal to the long axis such that each divot on a given corner along the beam has its long axis perpendicular to the long axis of the divots that on the same corner that are adjacent to the given divot and has each long axis on the same one of the sides as the long axis of another divot in that set of four corner divots, and with each subsequent set of corner divots extending back along the beam reduced in size from the previous set of corner divots.

* * * * *